Nov. 18, 1958

M. RAMUN 2,860,891

ADJUSTABLE FIFTH WHEEL ASSEMBLY
FOR TRACTOR-TRAILER AXLE-LOAD
EQUALIZATION

Filed June 7, 1956

INVENTOR
MICHAEL RAMUN

BY *Francis J. Klempay*
ATTORNEY

Nov. 18, 1958

M. RAMUN 2,860,891

ADJUSTABLE FIFTH WHEEL ASSEMBLY
FOR TRACTOR-TRAILER AXLE-LOAD
EQUALIZATION

Filed June 7, 1956

INVENTOR
MICHAEL RAMUN

BY Francis J. Klempay

ATTORNEY

United States Patent Office 2,860,891
Patented Nov. 18, 1958

2,860,891

ADJUSTABLE FIFTH WHEEL ASSEMBLY FOR TRACTOR-TRAILER AXLE-LOAD EQUALIZATION

Michael Ramun, Youngstown, Ohio

Application June 7, 1956, Serial No. 590,040

4 Claims. (Cl. 280—407)

This invention relates in general to coupling means for vehicles and in particular to an improved arrangement for adjusting the longitudinal position of a fifth wheel assembly for trailer trucks and the like.

Heretofore it has been proposed to adjustably mount the fifth wheel assembly of a trailer truck combination for longitudinal sliding movement in order to effect a load equalization on the various axles of the tractor or truck and the trailer. The fifth wheel assembly for such vehicles is usually carried on the tractor directly behind the driver's or operator's cab and generally over the main drive axle of the trailer truck combination. By shifting the fifth wheel assembly, and thus the point of coupling between the leading and trailing vehicle, a better distribution of load on the various axles can be obtained. The utility of such an arrangement is that it allows much more freedom in loading the trailer but yet makes it possible to comply with the various govermental regulations controlling the load which can be carried by each axle.

In addition to the above, various other uses have been suggested for a movable fifth wheel assembly. One such use is to control the spacing between the leading and trailing vehicle to allow ease of handling during normal road cruising operations when a relatively small separation is required and during so-called jack-knife or similar manipulating operations necessary for unloading which dictate a much greater separation of the trailer and tractor. Another suggested use has been with auxiliary load bearing axle and spring assemblies which are attached to the trailer to increase the load carrying capacity of the same. By adjustably mounting the fifth wheel assembly of the auxiliary component a better load equalization can be obtained.

Although these various proposals have been generally recognized as advantageous in equalizing the load on the various axles and for other uses, the adoption of such systems has been generally limited because of the complexity and difficulty experienced in operating the mechanisms advanced in the prior art. As an example, it is often necessary to employ several men when shifting the fifth wheel assembly to release various holding means and operate the tractor. This results in a time consuming procedure that is not readily adapted for trucking operations. It is therefore the primary object of the present invention to provide an improved arrangement for shifting the fifth wheel assembly of a vehicle which in fact can be completed entirely by the driver of the truck from the driver's cab in a minimum of time.

A problem of paramount importance in any such installation is safety since if the coupling means fails a serious accident is likely to result. Accordingly, another important object of the invention is to provide an adjustable fifth wheel assembly wherein any chance of accident due to failure of the adjusting mechanism is substantially and effectively mitigated.

A further object of the invention is to provide an arrangement whereby the tractive force of the vehicle is used to shift the fifth wheel and whereby a positive locking means is provided which is powered by and operated from the usual compressed air source found on trailer trucks and other like vehicles for actuating the brake mechanisms and the like. In this manner, expensive and complicated driving means are eliminated.

Yet another object of the invention is to provide an assembly having the characteristics outlined above which can be utilized to readily convert trailer trucks now in use having stationary fifth wheel assemblies.

A more specific object of the invention is to provide apparatus of the character described which is easily manufactured and assembled from a minimum of parts and which is adapted for sustained and continuous usage.

The above, as well as other objects and advantages of the invention, will become apparent upon consideration of the following detailed specification and accompanying drawing wherein there is shown and described a representative embodiment of the invention.

Figure 1:
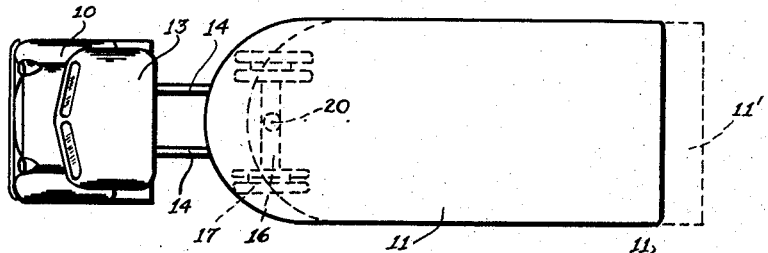
Figure 1 is a plan view of a trailer truck embodying the present invention, the dotted lines showing one alternative adjusted position.

Referring now to the drawing, and initially to Figure 1 thereof, there is shown a trailer truck comprising a truck or tractor 10 and a cargo-carrying trailer 11 joined in coupled relation by a fifth wheel assembly 12. The tractor 10 comprises a driver's or operator's cab 13 and a pair of rearwardly extending and spaced members 14 which support the fifth wheel assembly 12 in a manner to be hereinafter more fully described. The cab and the members 14 are supported by a pair of road-bearing axles 15 and 16 which carry the pneumatic tire assemblies 17. The axle 16 is usually the driven axle for the trailer truck combination.

The trailer 11 is of the conventional type having a rear axle 18 which carries tire assemblies 19 at its rear end and has a king pin 20 near its front end which is adapted to cooperate with the fifth wheel 12 to join the trailer and the tractor. In accordance with the teachings of the present invention, the fifth wheel assembly 12 is adapted for sliding movement in a longitudinal direction in order that the trailer can be shifted with respect to the tractor to afford a better equalization of load on the various axles 15, 16 and 18. In Figure 1 the trailer is shown in one position with the king pin 20 almost directly over the rear axle 16 of the tractor while the outline of the trailer represented at 11' represents an alternate adjusted position.

In order to effect movement of the fifth wheel assembly 12 there are provided a pair of I-beams 22 and 23 which are welded or attached by U-bolts or some other expedient means to the members 14 (part of the truck frame) and extend from a point generally over the axle 16 to a predetermined point behind this axle. The I-beams have a plurality of equally spaced and aligned apertures 24 in the web portion thereof throughout their length.

Mounted over the top rail of each of the I-beams in nesting relation therewith are slides 25–28 each of which is T-shaped in cross-section and has a number of apertures 29 in the downwardly depending legs thereof.

Figure 3:
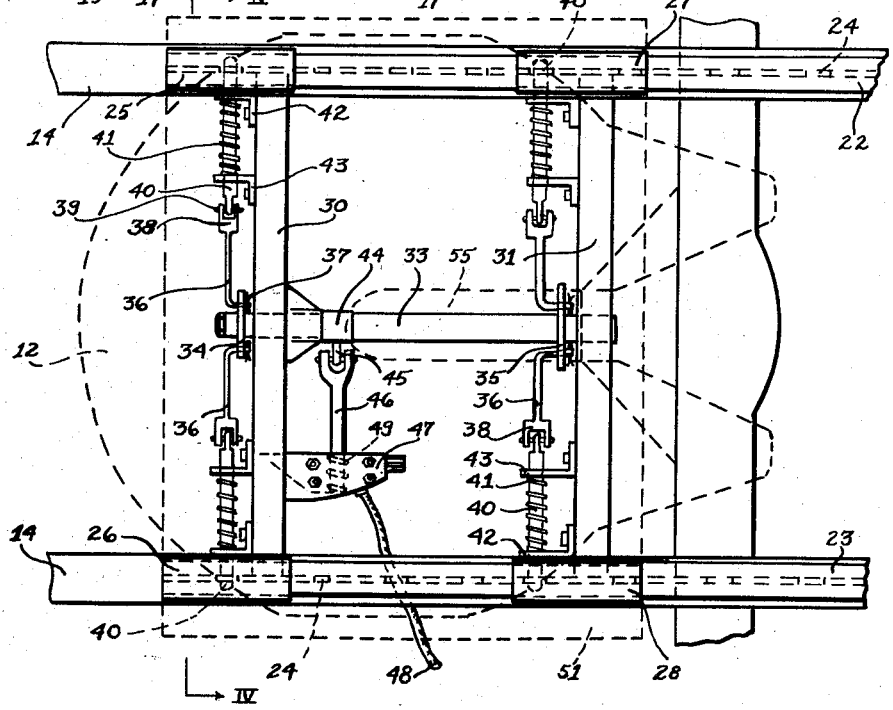
Figure 3 is a plan view of the rear portion of the truck with all trailer portions removed and the fifth wheel assembly shown in broken lines.
Figure 4:
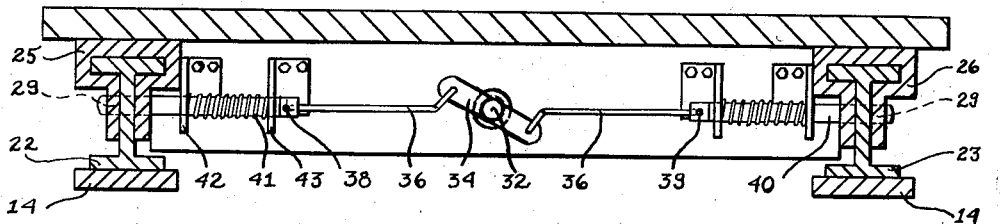
Figure 4 is an end view taken along the section line IV—IV of Figure 3.
Figure 5:
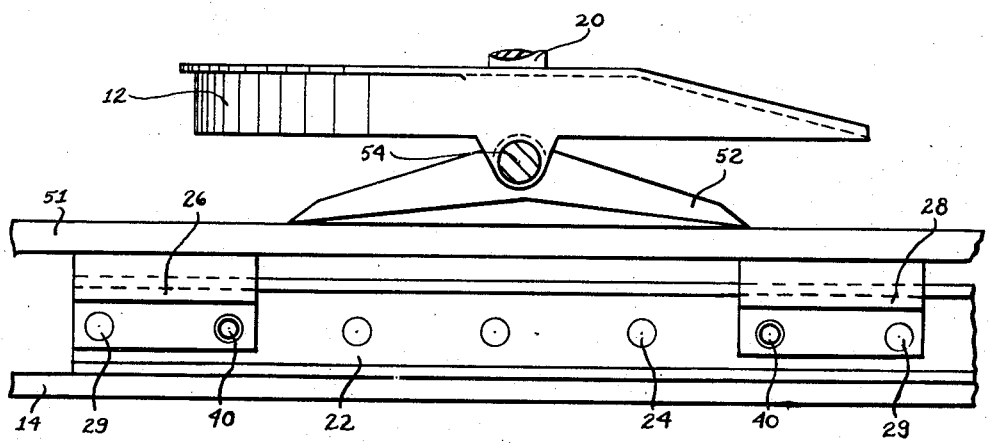
Figure 5 is a side view of the apparatus of the invention.
Figure 6:
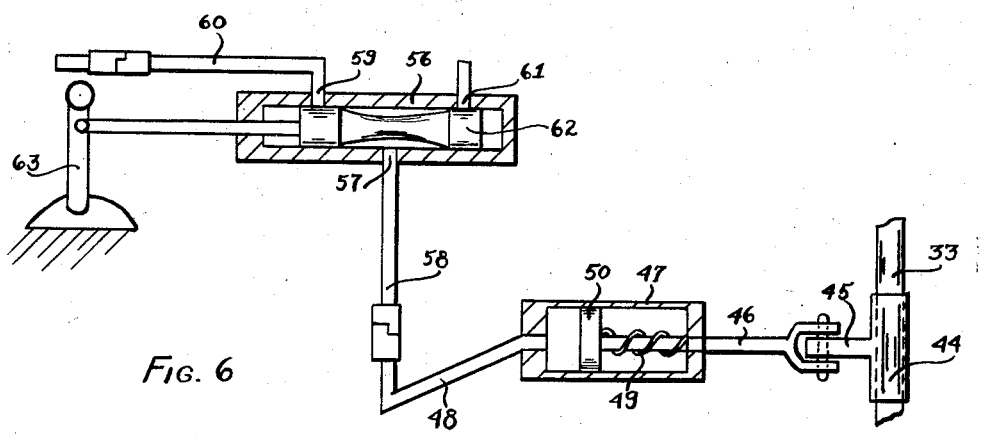
Figure 6 is a schematic diagram of the pneumatic controlling and operating circuit for the apparatus of the invention.

The front pair of slides, 25 and 26, are rigidly tied together by a cross bar 30 while the rear slides 27 and 28 are joined by a cross bar 31. These bars have their ends notched as shown to fit in cooperating relation against the slides and are attached thereto by welding or some other expedient attachment means. Intermediate the ends of the cross bars 30 and 31 are the aligned apertures 32 which serve to support and journal a longitudinally extending rod 33 in the manner shown. Rigidly attached to the rod 33 are links 34 and 35, each of which receives the inturned ends of the rods 36 with the ends thereof being retained by cotter pins 37. The other ends of the rods 36 are formed into clevises 38 which are pivotally connected by pins 39 to retaining pins 40. Each of the retaining pins 40 normally extends through the aligned apertures 24 and 29 of the I-beams and slides, respectively, and is retained in this position by a spring 41 having one end staked to the pin 40. A pair of spaced spring-supporting and mounting brackets 42 and 43 are provided for each of the retaining pins in the manner shown in Figure 3 of the drawing. These brackets not only serve to support the pins 40 but also provide abutment means for the spring 41.

Keyed to the rod 33 intermediate the ends thereof is a fitting 44 having a lateral extending link 45 which is in turn pivotally mounted to an operating lever 46 of a pneumatic air cylinder 47. The cylinder 47 is rigidly attached to the cross bar 30 and has an operating conduit 48 extending therefrom. This valve is preferably spring loaded whereby a spring 49 operates to return and retain the plunger 50 thereof in inoperative position after each actuation.

Mounted on top of the slides 25–28 in spanning and overlying relation therewith is a heavy plate 51 which properly positions and spaces the slides along the I-beams 22 and 23 and whose main function is to supply a supporting base for the fifth wheel assembly 12. Although any expedient means may be employed for mounting this assembly on the plate 51, this is accomplished in the present instance by providing a pair of spaced brackets 52 which are spanned by the through rod 54. The rod 54 pivotally mounts the fifth wheel assembly 12 so that the same is adapted to receive the king pin 20 during coupling operations in a well known manner. The fifth wheel assembly 12 is generally U-shaped with the opening 55 adapted to receive the king pin 20. In addition to the apparatus shown, it would, of course, be necessary to provide some type of opening and locking arrangement for retaining the king pin in the opening 55 when the tractor and trailer are coupled. It should be understood that any type of conventional locking arrangement could be utilized to block off the opening 55.

In accordance with the teachings of the present invention, I provide means for operating the adjustable fifth wheel assembly from within the driver's cab of the truck wherein only one operator need be employed to effect adjusting of the fifth wheel. This is accomplished by providing a pneumatic valve 56 which has the central port 57 thereof connected by a conduit 58 and a quick-detachable connector to the conduit 48 extending from the operating cylinder 47. A port 59 of this three-way valve is connected to a source of compressed air by the conduit 60 and this would usually and preferably be the source used to generate air for the operation of the brakes and other appurtenant equipment on the tractor trailer combination. The remaining port 61 is for exhausting the compressed air from the cylinder 47 as will be further explained.

In effect, the valve is operative to alternately connect the cylinder 47 with the compressed air and exhaust ports, 59 and 61, respectively, upon proper manipulation of a valving member 62 of the valve. This may be accomplished by providing a lever 63 conveniently mounted in the driver's cab on the steering wheel column, dashboard, or floor. It should be clearly understood that the lever 63 is not the only means of effecting actuation of the three-way valve 56 as solenoid switches operative to move the valving member in the correct direction or other equivalent means may be utilized as will be apparent to those skilled in this particular art. In any event however, the control for operating the three-way valve would be mounted in the driver's cab so that all operations can be performed by the driver from the interior of the cab.

Figure 2:
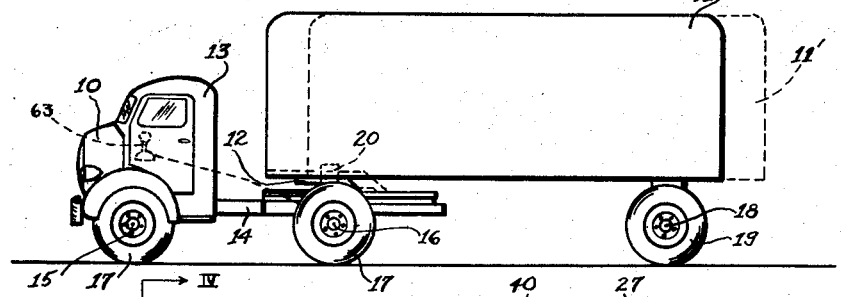
Figure 2 is a side elevation of the trailer truck shown in Figure 1.

Considering now the operation and utilization of the apparatus for adjusting the fifth wheel assembly, it is assumed that the truck and trailer have been coupled and are initially in the position shown in the solid lines in Figures 1 and 2 of the drawing. If the driver or operator finds it desirable to adjust the load on the various axles 15, 16, and 18 by moving the trailer to the rear with respect to the tractor or truck, he first applies his trailer brakes to the wheel assemblies 19 in order to hold the trailer relatively stationary. The next operation is to move the lever 63 to the right thereby moving the valving member to the right and effectively connecting the cylinder 47 to the source of compressed air through the various conduits above described. The compressed air moves the plunger 50 under the force of spring 49 and, as will be readily apparent from inspection of Figure 3 of the drawing, this causes the rod 33 to rotate. The rotation of rod 33 is effective to move the links 34 and 35 to such a position that the ends of the retaining pins 40 are retracted clear of the aligned apertures 24 and 29 in the I-beams and slides. The springs 41, of course, are compressed and tend to seat the pins 40 in the various apertures.

With these steps completed the operator slowly moves the truck or tractor forward while the fifth wheel assembly 12 and the trailer 11 remain in the same position since the trailer brakes are applied and the slides 25–28 are free to move on the I-beams 22 and 23. After the separation between the truck and trailer has been increased a sufficient distance, the operator stops the truck and moves the lever 63 completely to the left so that compressed air is relieved from the cylinder 47 through the exhaust port 61. This effects the return of the plunger 50 to its original position under the action of the spring 49 thereby tending to rotate the links 34 and 35 into their original position and seating the retaining pins 40 in different sets of aligned apertures 24 and 29. The springs 41, of course, tend to ram the pins 40 into the apertures as is apparent.

It may often be the case that when the compressed air is exhausted that the apertures in the slides will not be aligned with the apertures in the pair of spaced I-beams and if this be the condition the operator need only inch his truck forward or backward and the springs 41 will ram the retaining pins into the apertures as they become aligned. In the manner of operation discussed above, it is noted that the operator need not leave the cab in adjusting the connection between the trailer and the truck since complete control of the operation is afforded from the cab of the vehicle.

The operation to close the spacing between the truck and the trailer is the same except that the truck is moved backward instead of forward. Although the embodiment shown in the drawing is for the fifth wheel assembly between a truck and trailer, this same adjustable connection may be utilized wherever it is desirable to shift the fifth wheel assembly. As an example, such an arrangement can be used to mount the fifth wheel assembly of a detachable load-bearing spring and axle assembly as disclosed in my co-pending patent application Ser. No. 571,779 and filed March 15, 1956.

It will be apparent to persons skilled in the art that the shifting device disclosed above can also be used to shift load-bearing spring and axle assemblies of a trailer without the fifth wheel assembly. As an example, the rear axle of the trailer can be shiftably mounted and supported from beams by the utilization of my apparatus to allow better load distribution and equalization without the interconnecting fifth wheel assembly. Such an arrangement would be employed where there is no need for the pivotal movement afforded by the fifth wheel assembly.

It should thus be apparent that I have accomplished the objects initially set forth by providing an adjustable fifth wheel assembly which is characterized by its simplicity in construction and operation. One of the most important features of the apparatus is the automatic operation of the same which can be controlled directly from the cab of the truck by the driver. There is no need to release different holding and detent means, such as bolts, etc., which have characterized prior art equipment.

In addition to the above, the apparatus of the invention is completely safe and well adapted for rugged operation. The retaining pins are always urged into holding engagement by the various springs so that there is no chance of the same slipping or becoming loose. This is true even if the source of compressed air fails since the pins are always urged into the apertures unless air is supplied.

It should be noted that existing trucks with stationary fifth wheel assemblies can be easily and readily converted to allow movement of these assemblies according to the teachings of this invention with a minimum of alteration.

Having thus described an illustrated embodiment of the invention, it should be understood that many changes may be made therein without departing from the spirit or scope of the invention. Reference should therefore be had to the appended claims in determining the scope of the invention.

I claim:

1. A vehicle having a pair of parallel frame members, a pair of I-beams mounted in rigid relation on said members, a pair of channel slides fitted in nesting relation over the top rail of each of said I-beams, a plurality of spaced and aligned apertures in the web portions of said I-beams, apertures in said slides adapted to be aligned with said apertures in said I-beams, a pair of cross bars spanning said parallel members in parallel relation with each other and attached to said slides, a plate overlying said slides, a fifth wheel assembly mounted on said plate, said cross bars being apertured intermediate their ends, a rod journaled in said last mentioned apertures and being generally parallel with said parallel members, a pair of spaced links mounted on said rod, a plurality of retaining pins supported adjacent said cross bars and adapted to normally extend through aligned apertures of said slides and said I-beams, linkage means interconnecting said retaining pins and said links, a fitting attached to said rod, a fluid cylinder having its piston arm connected to said fitting, means for supplying fluid to said fluid cylinder whereby when said piston arm is actuated said rod is rotated to retract said pins from said apertures thereby allowing said slides to be moved on said I-beams, and said pins being the sole means of retaining said slides and said fifth wheel assembly in position with respect to said I-beams.

2. Apparatus according to claim 1 further characterized in that said means for supplying fluid comprises a valve, said valve having one port normally connected to said fluid cylinder, a second port communicating with the compressed air source of said vehicle, a third port serving as an exhaust, and said valve having a plunger and means for moving the same, the arrangement being such that said cylinder may be alternately connected with said compressed air source and said exhaust upon proper actuation of said means for moving.

3. Apparatus according to claim 2 further characterized in that said means for moving is mounted within the driver's cab of said vehicle whereby said fifth wheel assembly may be shifted by an operator in said cab.

4. In a vehicle having a pair of longitudinally extending spaced parallel frame members, a frame assembly longitudinally slidable and guided on said frame members in nesting relation therewith, a fifth wheel mounted on said frame assembly, said frame members and portions of said frame assembly having vertically extending adjacent and horizontally overlying sections, said sections of said frame members having a plurality of longitudinally spaced apertures and said sections of said frame assembly having apertures adapted to be aligned with selected ones of said apertures of said frame member sections, two pairs of longitudinally spaced transversely disposed and aligned interlocking pins carried by said frame assembly for sliding movement transversely outward whereby upon alignment certain of said apertures and outward movement of said pins through said certain apertures said frame assembly is rigidly locked against longitudinal movement along said frame members, means to move said pins inwardly and outwardly, said means to move comprising a rotatable longitudinally extending rod mounted on said frame assembly, linkage means interconnecting said rod and said interlocking pins, means to rotate said rod comprising a fluid cylinder, a valve for supplying fluid to said fluid cylinder, and means for actuating said valve mounted within the driver's cab of said vehicle whereby said frame assembly and fifth wheel carried thereby may be shifted by an operator in said cab.

References Cited in the file of this patent

UNITED STATES PATENTS

| Re. 23,704 | De Lay | Sept. 1, 1953 |
| 2,750,207 | Greenway | June 12, 1956 |

FOREIGN PATENTS

| 584,416 | Great Britain | Jan. 14, 1947 |